Dec. 14, 1937.                F. SCHÄR                2,102,239
DEVICE FOR DISPENSING MEASURED QUANTITIES OF LIQUID
Filed May 11, 1936
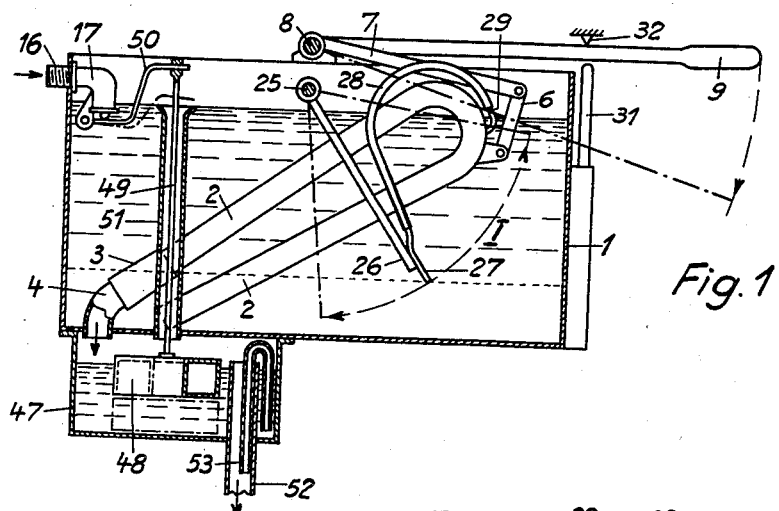
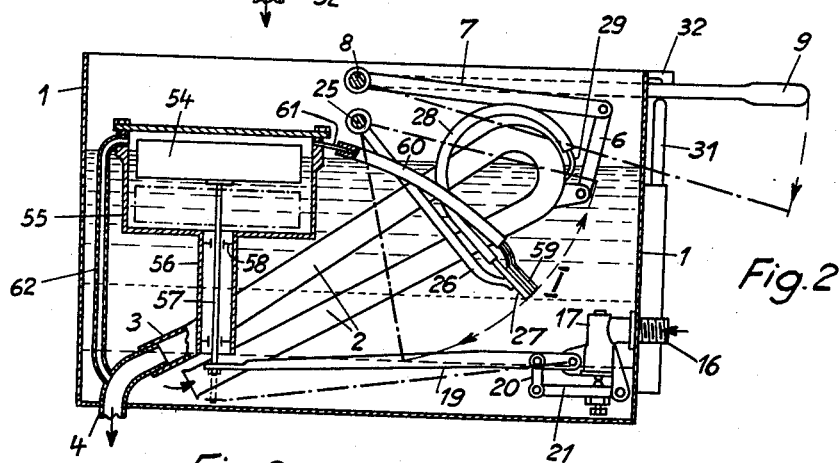
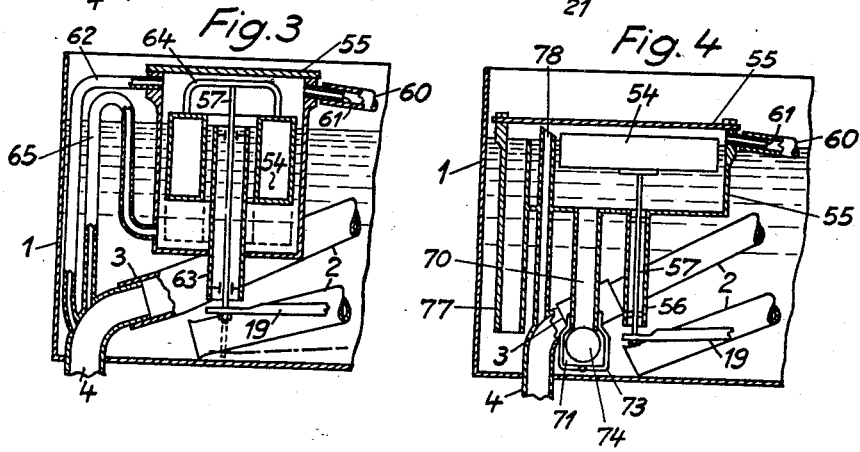
Inventor:
Fritz Schär Patented Dec. 14, 1937

2,102,239

UNITED STATES PATENT OFFICE 2,102,239

DEVICE FOR DISPENSING MEASURED QUANTITIES OF LIQUID

Fritz Schär, Zurich, Switzerland

Application May 11, 1936, Serial No. 79,191
In Switzerland May 10, 1935

10 Claims. (Cl. 221—95)

This invention relates to a device for dispensing predetermined quantities of liquid, the invention being especially applicable to a device for dispensing water in concrete mixing machines. Devices are already well known which are provided with a main liquid tank connected by an inlet valve controlled by a float to a supply pipe. Devices for dispensing liquids are also known provided with an outflow system of which the outflow limb is always free from liquid as long as the device is out of operation, whilst the inflow limb is located below the water level of the liquid tank.

In these known devices the syphon was set in operation by auxiliary means actuated from the outside, for example in that the highest point of the syphon was brought below the water level, or a water column was forced through the syphon, and so forth. It has also been proposed to cause the syphon to cease its operation automatically and thus the outflow of liquid as soon as the liquid level in the tank reached a predetermined lower limit.

These known devices have the disadvantage that the quantities of liquid to be dispensed at any time vary. During the outflow of liquid the inflow thereof from the supply pipe commences. In any case the known devices do not satisfy the conditions which are required in a concrete mixing machine.

The object of the present invention is to eliminate these and other known disadvantages of existing devices.

According to the present invention a device for dispensing liquid from a liquid tank which is connected by an inlet valve controlled by a float to a supply pipe and in which a syphon is provided, of which the outflow limb is free from liquid in the normal position of the device, whilst the syphon is set in operation from the outside by means of a lever or the like and automatically interrupts the outflow of liquid from the tank when a predetermined quantity of liquid has passed out of the main tank, is characterized in that a float is located in an auxiliary tank communicating with the main tank and with the outflow syphon, the auxiliary tank being only emptied when, as a result of the lowering of the liquid level in the main tank, an air inlet adjustable in height, is exposed so as to interrupt the outflow of liquid from the main tank, the float then opening an inlet valve to the main tank.

The accompanying drawing illustrates various examples of construction of the invention wherein:

Fig. 1 shows one form of construction of an apparatus in sectional elevation.

Fig. 2 shows a sectional elevation of a second form of construction.

Fig. 3 shows a sectional elevation of part of a third form of construction and

Fig. 4 shows a sectional elevation of part of a fourth form of construction.

In Fig. 1 the number 1 indicates the main liquid-tank, open at the top, which contains a syphon 2 formed by a bent pipe of which one limb is connected by a flexible pipe 3 to the outflow-pipe 4 provided in the bottom of the tank. The pipe 3 forms a hinge about which the syphon 2 is movable. The suction-limb of the latter lies freely in the tank 1. The syphon 2 is connected by a link 6 to an arm 7 keyed to a shaft 8 which is mounted on the tank 1 and is provided with an operating-lever 9 by which the syphon 2 can be moved.

A carrier-arm 26 is keyed to a shaft 25 mounted in the upper part of the tank 1 and carries a nozzle 27 which is connected by a flexible tube 28 to an elbow 29, fitted into the syphon 2. The shaft 25 carries an arm (not shown) which is located outside of the tank 1 which may be set relatively to a scale provided on the outside of the tank.

The quantity of water to be withdrawn from the tank 1 at any time can thus be seen and this quantity may be varied as desired within the predetermined limits by suitably setting the arm 26.

When the device is in the position of rest the lever 9 occupies the position shown in Fig. 1, whereby the vertex of the syphon 2 is located slightly above the highest level within the tank 1, which is rendered visible by a mark (not shown in the drawing) indicating and so-called zeroline of the tank 1, which constitutes a measuring vessel.

For the purpose of setting the device in operation the operating lever 9 is pulled downwardly, from the position shown in Fig. 1,—against the action of a spring loaded supporting rod 31, into the position shown by the chain dotted line. The syphon 2 is thus moved into a position in which it is fully submerged in the water contained in the tank 1 and is filled with water so that the water commences to flow out of the tank 1, through the syphon 2 and pipe 4. When the operating-lever 9 is released the spring-loaded rod 31 snaps it back into its raised position of rest whereby the syphon 2 also is returned into its initial position. The outflow from the tank 1 then continues through the syphon 2 until air is admitted to the vertex of the latter by the flexible tube 28, when the liquid-level in the tank 1 has dropped below the nozzle 27 and atmospheric air enters through the latter and into the flexible tube 28 and is drawn into the syphon 2 so that the flow of water through the latter is interrupted.

By resetting the arm outside the tank for the purpose of changing the quantity of liquid to be drawn off, the carrier-arm 26, together with the shaft 25, is correspondingly turned and thus the nozzle 27 is set at a lower or higher level, as may be required.

The priming of the syphon may be also effected in a different manner, e. g. as in the case of a flushing-box of a water-closet by filling the syphon-vertex by means of a pressure-piston, for which purpose a check-valve is provided in the suction-limb of the syphon, by flooding the syphon-vertex by submerging a displacer in the liquid to be drawn off, or by injecting a pressure-liquid into the suction-limb of the syphon, in which latter case the quantity of liquid to be injected must always be measurable.

The outflow pipe 4, discharges into an auxiliary tank 47, attached to the bottom of the tank 1, in which there is located a float 48 connected to a lever 50, for controlling the inlet-valve (in the housing 17), by means of a rod 49. The rod 49 passes through a filling and overflow pipe 51 contained in the tank 1, the lower end of the overflow pipe being located in the tank 47 and its upper end determining the zero-line in the tank 1. The tank 47 is provided with an overflow pipe 52 of which the upper end is somewhat higher than the head of water required for the buoyancy of the float 48 in the tank 47. A syphon 53 has its discharge limb in the overflow pipe 52 and its suction-limb in the tank 47.

By depressing the lever 9 and thus completely submerging the syphon 2 into the water of the tank 1 for a suitable length of time, the water runs out of the tank 1 into the auxiliary tank 47, through the pipe 4, and thus lifts the float 48. The water passes from the auxiliary tank 47 through the overflow 52, whilst the auxiliary tank 47 remains filled with water. The float 48 meanwhile occupies the raised-position shown thus holding the inlet valve, in housing 17, in the closed position by means of the lever 50, whereby the in-flow of water through pipe 16 into the tank 1 is stopped. When the outflow of water from tank 1 is interrupted by air entering the syphon 2 as above described the auxiliary tank 47 is almost completely emptied through the syphon 53. The float 48 in the auxiliary tank 47 accordingly sinks into the position shown by the dotted lines thus pulling down the lever 50 and opening the inlet-valve. Water now flows from the pipe 16 into the tank 1 and finally overflows from the latter into the auxiliary tank 47 through the overflow 51, so that the float 48 is again raised and thus closes the inlet-valve by means of lever 50. In this manner the water in the tank 1 is prevented from reaching the zero-line or the upper end of the spillway 51, before the syphon 53 has been drained.

In the example of construction shown in Fig. 2, the inflow of water into the tank 1 is controlled by a float 54 located in a tank 55 which communicates with the tank 1. A stand pipe 56 connects the tank 55 with the inside of the tank 1. A rod 57 attached to the float 54 passes through the stand-pipe 56, said rod passing through an upper and a lower guide. Said rod, at its lower end is connected to a lever 19 which acts on the inlet-valve by means of link 20 and arm 81. The inlet valve is located in a valve-housing 17 which is attached to the lower-part of the tank 1.

A nozzle 59 is secured to the carrier-arm 26, keyed to the shaft 25, said nozzle being located at a slightly somewhat higher level than the nozzle 27 and being connected to a pipe 61 at the upper part of the tank 55 by a flexible pipe 60. The parts 59, 60 and 61 form a system for admitting air into the tank 55 at a given time, while the nozzle 27 serves for admitting air into the syphon 2 at a given time. The upper end of a pipe 62, connected to the out-flow pipe 4, is located in the upper part of the tank 55 opposite the said pipe 61.

Water flows through the pipe 16 into the tank 1 when the inlet valve is opened by the lever 19 controlled by the float 54. The water then also rises in the pipe 56, and air is displaced from the tank 55 by the rising float 54 through the pipe 62 which does not contain any water. When the level of water in the tank 1 reaches the zero-line the inlet-valve is closed by lever 19, link 20, arm 21 and float 54 and the flow of water is shut off. All the parts of the apparatus are in the full position shown in the drawing.

By pulling down the operating lever 9, resulting in the downward and succeeding upward-movement of the syphon 2, the device commences to operate. When water flows out of the tank 1 through the syphon 2 a suction action is produced in the connecting pipe 62 (due to the flow in the out-flow pipe 4) and thus a partial vacuum in the tank 55 so that water flows into the latter through the nozzle 59 and the pipe 60 and then flows out of the tank 55 into the pipe 4 through the connecting pipe 62; a secondary flow thus results, starting from nozzle 59 and proceeding through the tank 55 and the connecting pipe 62. When a predetermined quantity of water has passed out of the tank 1, atmospheric air is first admitted into the tank 55 through the nozzle 59 and then into the syphon 2 through the nozzle 27. The level of water in the tank 55 thus gradually sinks lower and lower, as the supply of water to the tank 55 through nozzle 59 has ceased and the water in the tank 55 flows into tank 1 where the water is at a lower level, through pipe 56. The flow of water in the syphon 2 is also interrupted as atmospheric air is being drawn into it, so that the connecting-pipe 62 is drained completely and finally also the outflow pipe 4. As the level of water in the tank 55 sinks the float 54 sinks into its lowest position indicated by dotted lines and opens the inlet-valve by means of the lever 19 so that water from the pipe 16 flows into the tank 1. The water then also rises in the stand-pipe 56 and in turn in the tank 55 so that the float 54 is again raised to its upper position, indicated by full lines, when the water-level has reached the zero-line. During the rising of float 54 the inlet-valve is gradually closed by means of the lever 19 and is closed completely when the float 54 has reached its highest position thus shutting off the supply of water to the tank 1. The device is then again ready for operation, as illustrated in the drawing; at this stage water is contained in the tube 28 and in the pipe 60 up to the level of the water in the tank 1. It is then sufficient to pull down the operating-lever 9 for again effecting the sequence of operations described.

The construction in Fig. 3 differs from the preceding one in that the water in the tank 1, when it has reached the zero-line, flows into an annular space of the tank 55 through a stand-pipe 63. In this space is located the float 54, connected to the lever 19, serving to control the inlet-valve, by means of the rod 57; the latter is connected to the float 54 by means of a stirrup 64. A syphon 65 connects the tank 55 to the out-flow pipe 4.

When the device has been set in operation by the operating-lever (not shown in this figure) and water flows through the syphon 2, a partial vacuum is produced in the tank 55 due to the suction action in the pipe 62, as in the preceding construction, whereby water flows into the float-housing 55 through the pipe 60, thus producing a further rise in level in the tank 55, until finally water also flows out of the tank 55 through pipe 62 into the out-flow pipe 4. As long as no air is admitted into the tank 55, the latter cannot drain in spite of the fact that water is also being withdrawn therefrom through syphon 65 and pipe 62 (aided by the suction action produced by the flow in the pipe 4), since water is continuously flowing into the tank 55 through pipe 60 and nozzle 59 (not shown in Fig. 3), as the level of the water in the tank 1 has sunk, the lever 19, which actuates the inlet valve is reset. The water does not flow back into the tank 1 from the tank 55, but flows into the pipe 4 through the syphon 65. As the float 54 sinks in the tank 55 the inlet-valve is opened by the lever 19, and the float 54 is again raised from its lowest position indicated by dotted lines, by the water which flows over the upper edge of the stand pipe 63 into the tank 55, the float, on reaching its upper position, then again closing the inlet valve. The device is then again in the position shown ready for operation. The tank 55 and the syphon 65 are so dimensioned that the latter is drained before the level of water in the tank 1 has reached the zero-line, i. e. the upper end of the stand-pipe 63.

The following modification may be made in connection with the construction shown in Fig. 4. In order to empty the tank 55, after the desired quantity of liquid has ceased flowing from the tank 1, an out-flow pipe 70 may be provided in place of the syphon 65 at the bottom of the tank 55, this pipe 70 reaching down to near the bottom of the tank 1. At the lower end of the pipe 70 a cage 73 and within the cage a floating ball 74 is arranged which closes the orifice of pipe 70 when the tank is full of water. A pipe 77 leads from the tank 55 to near the bottom of tank 1 and another pipe 78 leads from the pipe 4 to near the top of tank 55. This pipe 78 may serve to control the flow by means of the non-return-valve 71 in such a manner that the flow is stopped when filling the tank 1 and that a return flow into tank 1, out of the tank 55, may take place, after the desired quantity of liquid has passed out of the tank 1, under the action of the difference in level in the tanks 55 and 1 similar to the arrangement described in connection with Fig. 3.

It will be understood that various modifications may be possible in the details of construction of the examples described. The shafts 8 and 25 for example may be arranged co-axially.

What I claim is:

1. A device for dispensing predetermined quantities of liquid comprising in combination, a liquid supply pipe, a vessel connected to said pipe, an inlet valve, a float controlling said inlet valve, a syphon within said vessel, means to prime the syphon, a tube communicating with the intake leg of said syphon, the inlet opening of said tube being placed at the discharge level of the vessel, hydraulic means to automatically time the opening of said valve by said float.

2. A device for dispensing predetermined quantities of liquid comprising in combination, a liquid supply pipe, a vessel connected to said pipe, an inlet valve, a float controlling said inlet valve, a syphon within said vessel, means to prime the syphon, a tube communicating with the intake leg of said syphon, the inlet opening of said tube being placed at the discharge level of the vessel, hydraulic means to automatically time the opening of said valve by said float, said hydraulic means comprising a chamber adapted to receive said float, a tube connecting said chamber with said vessel to allow the liquid from the vessel to enter said chamber, an air tube communicating with the space of the chamber above the float and having its open end submerged in the liquid at the discharge level, means to discharge the liquid of said chamber.

3. A device for dispensing liquid, comprising a main tank adapted to receive the liquid to be dispensed, an inlet valve mounted in said tank and connected to a source of supply of liquid, a syphon in the form of a U-tube movably mounted in said tank, said syphon having inflow and outflow limbs extending towards the bottom of the tank, an outlet pipe at the bottom of the tank, a flexible connection between said outflow pipe and said outflow limb, an auxiliary tank associated with said main tank and communicating therewith a float in said auxiliary tank, said float being connected to said inlet valve, said syphon having an air inlet in the connection between the inflow and outflow limbs thereof, the arrangement being such that said float only opens the inlet valve, when, as a result of the lowering of the liquid level in the main tank, the air inlet is exposed and thus interrupts the outflow of liquid from the main tank.

4. A device for dispensing liquid, comprising a main tank adapted to receive the liquid to be dispensed, an inlet valve mounted in said tank and connected to a source of supply of liquid, a syphon in the form of a U-tube movably mounted in said tank, said syphon having inflow and outflow limbs extending towards the bottom of the tank, an outlet pipe at the bottom of the tank, a flexible connection between said outflow pipe and said outflow limb, an auxiliary tank associated with said main tank and communicating therewith, a float in said auxiliary tank, said float being connected to said inlet valve, said syphon having an air inlet in the connection between the inflow and outflow limbs thereof, means to adjust the level of liquid in the main tank, said adjusting means comprising a lever pivotally mounted on said main tank and links connecting said lever to said syphon, the arrangement being such that the syphon can be raised and lowered in position in the main tank so as to vary the level of liquid therein.

5. A device for dispensing liquid, comprising a main tank adapted to receive the liquid to be dispensed, an inlet valve mounted in said tank and connected to a source of supply of liquid, a syphon in the form of a U-tube movably mounted in said tank, said syphon having inflow and outflow limbs extending towards the bottom of the tank, an outlet pipe at the bottom of the tank, a flexible connection between said outflow pipe and said outflow limb, an auxiliary tank associated with said main tank and communicating therewith, a float in said auxiliary tank, said float being connected to said inlet valve, said syphon having an air inlet in the connection between the inflow and outflow limbs thereof, said auxiliary tank, being located underneath the main tank, a stand pipe located in said main tank, the upper end of said stand pipe being on a level with the maximum level of liquid in said main tank, the lower end of said stand pipe leading into said auxiliary tank, said outflow pipe also leading into said auxiliary tank, a rod connected to said float, said rod passing through said stand pipe and connected to said inlet valve, an outflow pipe from said auxiliary tank and a syphon having one limb in said auxiliary tank and one limb in said last mentioned outflow pipe, said last mentioned syphon serving to empty said auxiliary tank.

6. A device for dispensing liquid, comprising a main tank adapted to receive the liquid to be dispensed, an inlet valve mounted in said tank and connected to a source of supply of liquid, a syphon in the form of a U-tube movably mounted in said tank, said syphon having inflow and outflow limbs extending towards the bottom of the tank, an outlet pipe at the bottom of the tank, a flexible connection between said outflow pipe and said outflow limb, an auxiliary tank associated with said main tank and communicating therewith, a float in said auxiliary tank, said float being connected to said inlet valve, said syphon having an air inlet in the connection between the inflow and outflow limbs thereof, said auxiliary tank being mounted within said main tank, a stand pipe extending from the bottom of said auxiliary tank and extending to near the bottom of said main tank, a rod passing through said stand pipe, said rod being connected to said float and to said inlet valve, said auxiliary tank being closed at the bottom, said auxiliary tank being located in such a position in the main tank that a portion thereof is above the maximum level of liquid in said main tank, and a pipe connecting said space to said outflow pipe.

7. A device for dispensing liquid, comprising a main tank adapted to receive the liquid to be dispensed, an inlet valve mounted in said tank and connected to a source of supply of liquid, a syphon in the form of a U-tube movably mounted in said tank, said syphon having inflow and outflow limbs extending towards the bottom of the tank, an outlet pipe at the bottom of the tank, a flexible connection between said outflow pipe and said outflow limb, an auxiliary tank associated with said main tank and communicating therewith, a float in said auxiliary tank, said float being connected to said inlet valve, said syphon having an air inlet in the connection between the inflow and outflow limbs thereof, said auxiliary tank being mounted within said main tank, a stand pipe extending from the bottom of said auxiliary tank and extending to near the bottom of said main tank, a rod passing through said stand pipe, said rod being connected to said float and to said inlet valve, said auxiliary tank being closed at the bottom, said auxiliary tank being located in such a position in the main tank that a portion thereof is above the maximum level of liquid in said main tank, and a pipe connecting said space to said outflow pipe, an arm pivotally mounted in said main tank, a pair of nozzles located at the lower end of said arm, said nozzles being adapted to be moved into various positions by said arm whereby the quantity of liquid to be dispensed may be varied, and a pair of flexible pipes, one of said pipes connecting one of said nozzles to said space, and the other connecting the second nozzle to said air inlet.

8. A device according to claim 3 including an arm pivotally mounted in said tank and operable from the outside, a nozzle mounted at the lower end of said arm, and a flexible pipe connecting said nozzle to said air inlet, said nozzle being adapted to be moved into various positions by said arm.

9. A device according to claim 3, wherein said auxiliary tank is mounted in said main tank, a stand pipe passing into said auxiliary tank, the upper end of said stand pipe being on a level with the upper liquid level in said main tank, whilst the lower end thereof leads to near the bottom of said main tank, said auxiliary tank being closed at its upper end and having a space above the main liquid level, a rod passing through said stand pipe, said rod being connected to said float and to said inlet valve, a pipe connecting the upper space of said auxiliary tank to said outflow pipe, and a syphon connecting the lower portion of said auxiliary tank to said outflow pipe.

10. Device according to claim 3, wherein the auxiliary tank is located in the main tank, two pipes associated with said tank, the lower ends of said pipes being located between the lowest level of liquid in said main tank, one of said pipes serving to fill said auxiliary tank and leading to near the top thereof, whilst the other pipe, serving for emptying the auxiliary tank, leads to the bottom of said auxiliary tank, and a check valve, said check valve being so arranged as to stop the flow when filling the main tank whilst a return flow into the main tank from the auxiliary tank takes place after a predetermined quantity of liquid has passed out of the main tank.

FRITZ SCHÄR.